(12) United States Patent
Lim

(10) Patent No.: US 11,503,369 B2
(45) Date of Patent: Nov. 15, 2022

(54) ELECTRONIC APPARATUS AND METHOD FOR CONTROLLING ELECTRONIC APPARATUS

(71) Applicant: SAMSUNG ELECTRONICS CO., LTD., Suwon-si (KR)

(72) Inventor: Hun Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/710,377

(22) Filed: Dec. 11, 2019

(65) Prior Publication Data

US 2020/0186881 A1 Jun. 11, 2020

(30) Foreign Application Priority Data

Dec. 11, 2018 (KR) ........................ 10-2018-0158800

(51) Int. Cl.
*H04N 21/462* (2011.01)
*H04N 21/262* (2011.01)
*H04N 21/41* (2011.01)
*H04N 21/431* (2011.01)
*H04N 21/482* (2011.01)

(52) U.S. Cl.
CPC ... *H04N 21/4622* (2013.01); *H04N 21/26283* (2013.01); *H04N 21/4131* (2013.01); *H04N 21/4314* (2013.01); *H04N 21/4828* (2013.01)

(58) Field of Classification Search
None
See application file for complete search history.

(56) References Cited

U.S. PATENT DOCUMENTS

| | | | |
|---|---|---|---|
| 6,532,592 B1* | 3/2003 | Shintani | H04N 21/42207 725/141 |
| 6,766,526 B1* | 7/2004 | Ellis | H04N 21/482 725/57 |
| 6,934,964 B1 | 8/2005 | Schaffer et al. | |
| 6,978,471 B1* | 12/2005 | Klopfenstein | H04N 21/435 725/50 |
| 6,992,728 B2* | 1/2006 | Takagi | H04N 21/4345 348/569 |
| 8,731,379 B1* | 5/2014 | Craner | H04N 21/23113 386/326 |
| 9,635,075 B2* | 4/2017 | Ma | H04N 21/235 |

(Continued)

FOREIGN PATENT DOCUMENTS

| | | |
|---|---|---|
| CN | 105119789 A | 12/2015 |
| EP | 3 116 219 A1 | 1/2017 |

(Continued)

OTHER PUBLICATIONS

International Search Report (PCT/ISA/210) dated Mar. 23, 2020 issued by the International Searching Authority in International Application No. PCT/KR2019/017329.

(Continued)

*Primary Examiner* — Ricky Chin
(74) *Attorney, Agent, or Firm* — Sughrue Mion, PLLC

(57) ABSTRACT

An electronic apparatus maps each of a plurality of services to a channel number and provides an electronic program guide (EPG) that includes a broadcast channels and the plurality of services mapped to channel numbers of the electronic apparatus.

16 Claims, 23 Drawing Sheets

(56) References Cited

U.S. PATENT DOCUMENTS

| | | | |
|---|---|---|---|
| 10,021,336 B2 | 7/2018 | Heo et al. | |
| 10,405,049 B2 | 9/2019 | Shin | |
| 2004/0221307 A1* | 11/2004 | Arai | H04N 21/4821 |
| | | | 725/44 |
| 2007/0124764 A1* | 5/2007 | Morris | H04N 21/4314 |
| | | | 725/37 |
| 2007/0124773 A1* | 5/2007 | Morris | H04N 21/4147 |
| | | | 725/61 |
| 2008/0077960 A1* | 3/2008 | Griggs | H04N 21/4314 |
| | | | 725/46 |
| 2008/0235728 A1* | 9/2008 | Kim | H04N 21/426 |
| | | | 725/39 |
| 2008/0309759 A1* | 12/2008 | Wilson | H04N 21/8126 |
| | | | 348/143 |
| 2010/0017825 A1* | 1/2010 | Shin | H04N 21/478 |
| | | | 725/47 |
| 2010/0218213 A1* | 8/2010 | Park | H04N 21/435 |
| | | | 725/40 |
| 2010/0246597 A1* | 9/2010 | Ma | H04N 21/482 |
| | | | 370/431 |
| 2011/0030016 A1 | 2/2011 | Pino, Jr. et al. | |
| 2011/0239251 A1* | 9/2011 | Miller | H04N 21/4344 |
| | | | 725/40 |
| 2012/0291068 A1* | 11/2012 | Khushoo | H04L 12/282 |
| | | | 725/38 |
| 2013/0125177 A1* | 5/2013 | Pino | H04N 21/4131 |
| | | | 725/80 |
| 2015/0074725 A1* | 3/2015 | Hale | H04N 21/4622 |
| | | | 725/49 |
| 2015/0289024 A1 | 10/2015 | Yoon et al. | |
| 2016/0366481 A1* | 12/2016 | Lim | H04N 21/42207 |
| 2017/0013224 A1* | 1/2017 | Heo | H04N 5/44513 |
| 2017/0105046 A1 | 4/2017 | Shin | |
| 2018/0206001 A1 | 7/2018 | Kim | |
| 2020/0186881 A1* | 6/2020 | Lim | H04N 21/43615 |

FOREIGN PATENT DOCUMENTS

| | | |
|---|---|---|
| JP | 2001-346187 A | 12/2001 |
| KR | 100782872 B1 | 12/2007 |
| KR | 10-2008-0086765 A | 9/2008 |
| KR | 10-1044674 B1 | 6/2011 |
| KR | 101358850 B1 | 2/2014 |
| KR | 10-1533699 B1 | 7/2015 |
| KR | 1020150117212 A | 10/2015 |
| KR | 10-2017-0006096 A | 1/2017 |
| KR | 10-1698787 B1 | 1/2017 |
| KR | 10-2017-0042086 A | 4/2017 |

OTHER PUBLICATIONS

Written Opinion (PCT/ISA/237) dated Mar. 23, 2020 issued by the International Searching Authority in International Application No. PCT/KR2019/017329.

Communication dated Apr. 7, 2020, issued by the European Patent Office in European Application No. 19214622.3.

Communication dated May 12, 2021, issued by the European Patent Office in counterpart European Application No. 19214622.3.

Communication dated Jun. 29, 2021, issued by the China National Intellectual Administration in Chinese Application No. 201911262623.5.

Communication dated Mar. 1, 2022, issued by the China National Intellectual Property Administration in Chinese Application No. 201911262623.5.

* cited by examiner

FIG. 1

| CH # | CH. Name | 11:00 | 11:30 | 12:00 |
|---|---|---|---|---|
| 498 | Sport TV | AAA : BBB | | |
| 499 | Animation TV | CCC | | |
| 500 | Ir-Room Control | | | |
| 501 | Light #1 | On | Off | |
| 502 | Drapery | Closed | Open | |
| 600 | Energy | ACCUMULATED MONTHLY ENERGY USE : 13kW/M, 90000WON | | |
| 601 | Heating/Cooling | 1500Wh | | |
| 602 | Appliances | 380Wh | | |
| 603 | Lighting | 800Wh | | |
| 700 | Security | Outdoor | | Front Door |
| 701 | Front Door | | | Detected |
| 702 | Outdoor | Detected | | |
| 800 | Mode | | Movie Mode | |
| 801 | Good Morning | | | |
| 802 | Movie | | Activated | |
| 902 | Status | | | |

CURRENT TIME

FIG. 6A

| Service Name | Location | Channel No. |
|---|---|---|
| In-Room Control | TV App. | 500 |
| Energy | TV App. | |
| Security | | |
| Mode | | |
| Maintenance | | |
| | | |
| | | |

| Service Name | Location | Channel No. |
|---|---|---|
| In-Room Control | TV App. | 500 |
| Energy | TV App. | 6 |
| Security | | |
| Mo | | |
| Ma | | |

610

| No. | Channel |
|---|---|
| 6 | SBS |
| 60 | KBS N |
| 61 | SBS Sports |
| 62 | MBC Sports |
| 63 | (empty) |

| Service Name | Location | Channel No. |
|---|---|---|
| In-Room Control | TV App. | 500 |
| Energy | TV App. | 60 |
| Security | | |
| Mo | | |
| Ma | | |

610

| No. | Channel |
|---|---|
| 60 | KBS N |
| 61 | SBS Sports |
| 62 | MBC Sports |
| 63 | (empty) |
| 500 | (empty) |

| CH # | CH. Name | SERVICE TYPE AND LOCATION | |
|---|---|---|---|
| 1 | Welcome | | ⎫ |
| 5 | SBS | | |
| 7 | KBS2 | | |
| 9 | KBS 1 | | 710 |
| 11 | MBC | | |
| 24 | YTN | | |
| ... | | | |
| ... | | | ⎭ |
| 500 | In-Room Control | tvapp://irc.tizen.app | ⎫ |
| 600 | Energy Usage | tvapp://energy.tizen.app | |
| 700 | Security | tvapp://security.tizen.app | 720 |
| 800 | Mode | tvapp://mode.tizen.app | |
| 801 | Mode - Movie | tvapp://mode.tizen.app/movie | |
| 900 | Maintenance | http://cloud.samsung.com/maintenance | ⎭ |

FIG. 8

| CH # | CH. Name |
|---|---|
| 1 | Information |
| 5 | SBS |
| 7 | KBS2 |
| 9 | KBS 1 |
| 11 | MBC |
| 24 | YTN |
| ... | |
| ... | |
| 500 | In-Room Control |
| 600 | Energy Usage |
| 700 | Security |
| 800 | Mode |
| 900 | Maintenance |

500. In-Room Control
  501. Light #1
  502. Drapery
  503. Thermostat

600. Energy Usage
  601. Heating / Cooling
  602. Appliances
  603. Lighting

700. Security (Monitoring)
  701. Front Door
  702. Outdoor
  703. Living Room

800. Mode
  801. Good Morning
  802. Movie
  803. Going Out

900. Maintenance Call
  901. Request
  902. Status
  903. History

FIG. 9

| CH # | CH. Name | 11:00 | 11:30 | 12:00 |
|---|---|---|---|---|
| 498 | Sport TV | AAA : BBB | | |
| 499 | Animation TV | CCC | | |
| 500 | Ir-Room Control | | | |
| 501 | Light #1 | On | Off | |
| 502 | Drapery | Closed | Open | |
| 600 | Energy | ACCUMULATED MONTHLY ENERGY USE : 13kW/M, 9000WON | | |
| 601 | Heating/Cooling | 1500Wh | | |
| 602 | Appliances | 380Wh | | |
| 603 | Lighting | 800Wh | | |
| 700 | Security | Outdoor | | Front Door |
| 701 | Front Door | | | Detected |
| 702 | Outdoor | Detected | | |
| 800 | Mode | | Movie Mode | |
| 801 | Good Morning | | | |
| 802 | Movie | | Activated | |
| 902 | Status | | | |

FIG. 10C

| CH # | CH. Name | 11:00 | 11:30 | 12:00 |
|---|---|---|---|---|
| 498 | Sport TV | | | |
| 499 | Animation TV | | | |
| 500 | Ir-Room Control | | | |
| 501 | Light #1 | | ☐ | |
| 502 | Drapery | | | |
| 600 | Energy | | | |
| 601 | Heating/Cooling | | | |
| 602 | Appliances | | | |
| 603 | Lighting | | | |
| 700 | Security | | | |
| 701 | Front Door | | | |
| 702 | Outdoor | | | |
| 800 | Mode | | | |
| 801 | Good Morning | | | |
| 802 | Movie | | | |
| 902 | Status | | | |

CURRENT TIME 940

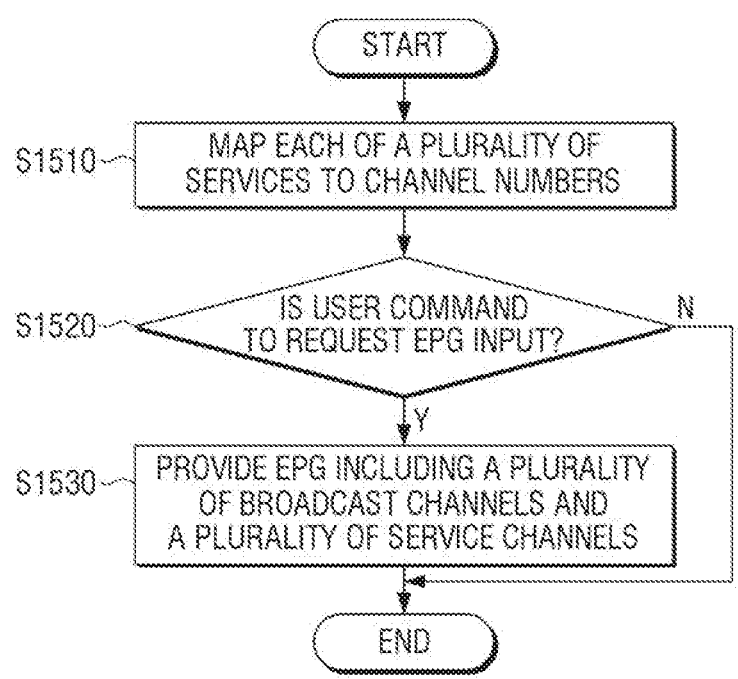

ELECTRONIC APPARATUS AND METHOD FOR CONTROLLING ELECTRONIC APPARATUS

CROSS-REFERENCE TO RELATED APPLICATION(S)

This application is based on and claims priority under 35 U.S.C. § 119(a) from Korean Patent Application No. 10-2018-0158800, filed on Dec. 11, 2018, in the Korean Intellectual Property Office, the disclosure of which is incorporated by reference herein in its entirety.

BACKGROUND

1. Field

The disclosure relates to an electronic apparatus and a controlling method thereof. More particularly, the disclosure relates to an electronic apparatus that provides an electronic program guide (EPG) including a broadcast channel and a service channel and a controlling method thereof.

2. Description of the Related Art

A modern electronic apparatus, for example, a smart television, can provide a variety of services rather than simply receiving and reproducing broadcast content. For example, an electronic apparatus may provide various services through an application or widget installed in the electronic apparatus, provide a service through the Internet via a communication interface, and provide a service capable of controlling an external Internet of Things (IoT) device.

In general, in order for an electronic apparatus to provide multiple services, a separate user interface (UI) or a separate remote controller exists owing to a need for providing additional user inputs necessary for controlling the electronic apparatus to execute the variety of functions provided by the services. For example, a user selects an application through a separate application list provided by the electronic apparatus to execute the application, and in order to control the external device for executing functions of the selected application, the user controls the external device through a button (for example, a lights-out button, etc.) provided on a separate remote controller.

That is, the user may be inconvenienced to have a separate UI or a separate remote controller to perform various services through the electronic apparatus.

Thus, there is a necessity to enable a user to more conveniently and more intuitively perform a variety of services offered by the modern electronic apparatus.

SUMMARY

According to an embodiment, there is provided an electronic apparatus including a memory configured to store at least one instruction; and a processor configured to execute the at least one instruction to control execution to store in the memory a mapping of a service of an application installed on the electronic apparatus to a service channel number of the electronic apparatus and display an electronic program guide (EPG) comprising a broadcast channel associated with a broadcast channel number of the electronic apparatus and the service channel number mapped to the service.

According to an embodiment, there is provided a method of controlling an electronic apparatus including mapping a service of an application installed on the electronic apparatus to a service channel number of the electronic apparatus and displaying an electronic program guide (EPG) comprising a broadcast channel associated with a broadcast channel number of the electronic apparatus and the service channel number mapped to the service.

BRIEF DESCRIPTION OF THE DRAWINGS

The above and other aspects, features, and advantages of certain embodiments of the disclosure will be more apparent from the following description taken in conjunction with the accompanying drawings, in which:

[0010] FIG. 1 illustrates an EPG provided by an electronic apparatus according to an embodiment;

FIGS. 5, 6A-C, 7, and 8 are views to describe an embodiment of assigning a channel number by searching for a service channel according to an embodiment;

FIGS. 9 to 10A-C are views to describe a method for setting service reservation information through the EPG according to an embodiment;

FIG. 15 illustrates a flowchart of a method for controlling an electronic apparatus according to an embodiment.

Throughout the drawings, like reference numerals will be understood to refer to like parts, components, and structures.

DETAILED DESCRIPTION

Figure 2:
FIG. 2 and FIG. 3 are block diagrams illustrating configurations of an electronic apparatus according to an embodiment.

The disclosure provides an electronic apparatus that may assign a channel to a plurality of services and provide an electronic program guide (EPG) including a plurality of broadcast channels and a plurality of service channels, and a controlling method thereof.

The disclosure will be described in greater detail, with reference to the attached drawings.

General terms that are currently widely used were selected as terms for describing the embodiments of the disclosure in consideration of functions in the disclosure, but other terminology may be understood based on the intention of those skilled in the art of the disclosure, the emergence of a new technique, and the like. In addition, in a specific configuration, additional terms may be selected herein. In this configuration, the meaning of such terms will be mentioned in detail in a corresponding portion of the disclosure. Therefore, the terms used in embodiments of the disclosure should be defined on the basis of the meaning of the terms and the contents throughout the disclosure rather than simply the names of the terms.

In this specification, the expressions "have," "may have," "include," or "may include" or the like represent presence of a corresponding feature (for example: components such as numbers, functions, operations, or parts) and the expressions do not exclude the presence of additional features.

The expression "at least one of A or/and B" should be understood to represent "A" or "B" or any one of "A and B."

As used herein, the terms "first," "second," or the like may denote various components, regardless of order and/or importance, and may be used to distinguish one component from another, and do not limit the components.

In addition, the description in the disclosure that one element (e.g., a first element) is "(operatively or communicatively) coupled with/to" or "connected to" another element (e.g., a second element) should be interpreted to include both the configuration that the one element is directly coupled to the another element, and the configuration that the one element is coupled to the other element through still another intervening element (e.g., a third element).

A singular expression includes a plural expression, unless otherwise specified. It is to be understood that the terms such as "comprise" or "consist of" are used herein to designate a presence of a characteristic, number, step, operation, element, component, or a combination thereof, and these terms do not to preclude a presence or a possibility of adding one or more of other characteristics, numbers, steps, operations, elements, components or a combination thereof.

The term such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in dedicated hardware, the components may be integrated in at least one module or chip and be realized in at least one processor.

The electronic apparatus in accordance with embodiments of the disclosure is an electronic apparatus capable of providing a broadcast content and may include at least one of, for example, a television (TV), smartphones, tablet personal computers (PCs), mobile phones, video telephones, electronic book readers, desktop PCs, laptop PCs, netbook computers, workstations, servers, a personal digital assistant (PDA), a portable multimedia player (PMP), an MP3 player, a medical device, a camera, or a wearable device. The electronic apparatus according to the various embodiments may also include an electronic apparatus omitting a display, and may include at least one of, for example, a set top box, a digital versatile disc (DVD) player, a Blu-ray disc (BD) player, home automation control panels, security control panels, media box (e.g., Samsung HomeSync™, Apple TV™, or Google TV™), or game consoles (e.g., Xbox™, PlayStation™).

In this disclosure, the term user may refer to a person who uses, controls, or otherwise operates an electronic apparatus or an apparatus (example: artificial intelligence electronic apparatus) that uses, controls, or otherwise operates an electronic apparatus.

FIG. 1 illustrates an electronic program guide (EPG) provided by an electronic apparatus according to an embodiment.

The electronic apparatus 100 may obtain broadcast content through one of a plurality of broadcast channels to reproduce broadcast content. In addition, the electronic apparatus 100 may provide other services, for example via applications or widgets installed on the electronic apparatus, in addition to a service of receiving and reproducing broadcast content. For example, the electronic apparatus 100 may provide at least one of a service associated with an application installed in the electronic apparatus 100, an Internet search service, a service for controlling an external device (in particular, an IoT device), etc.

In addition, the electronic apparatus 100 may map each of the plurality of services to a channel number. To be specific, the electronic apparatus 100 may receive a user command for channel search (or channel scanning). In this configuration, the electronic apparatus 100 may search for a broadcast channel in response to a user command, and may search for a plurality of services provided by the electronic apparatus 100. The electronic apparatus 100 may, based on information of an application currently installed in the electronic apparatus 100, an Internet search service that the current electronic apparatus 100 may provide, and information on an external device that may be connected to the electronic apparatus 100 for control thereof, search for services provided by the electronic apparatus 100.

The electronic apparatus 100 may select at least one of a plurality of searched services and map a channel number to each service. Thereby, a user of the electronic apparatus 100 may provide a user input for inputting a channel number associated with the selected service, to select and launch a particular service. The services may be mapped to channel numbers according to user input, so that the user may select particular channel numbers mapped to each service, or the electronic apparatus 100 may map channel numbers to each service. For example, the electronic apparatus 100 may map channel numbers, which are higher than channel numbers associated with broadcasting stations, to each service.

The plurality of service channels may include a plurality of high-level service channels corresponding to the plurality of categories and a plurality of low-level service channels included in each of the plurality of categories. For example, the plurality of categories may include at least one of an external device control category, an energy usage verification category, a security category, and a service mode category. In addition, the high-level service channel corresponding to the external device control category may include low-level service channels such as a TV control channel, a speaker control channel, a light control channel, and a blind control channel. The high-level service channel corresponding to the energy usage checking category may include a TV usage check channel, light usage check channel, washing machine usage check channel, or the like. The high-level service channels corresponding to the security category may include low-level service channels such as living room camera channel, front door camera channel, and kitchen camera channel. The high-level service channel corresponding to the service mode category may include low-level service channels such as a birthday party mode channel, a game mode channel, a movie mode channel, and an energy saving mode channel. The first high-level service channel corresponding to the first category and the plurality of first low-level service channels included in the first category may have adjacent channel numbers. For example, if the high-level service channel corresponding to the external device control category is 500, the TV control channel may be assigned to 501, the speaker control channel may be 502, the light control channel may be 503, and the blind control channel may be 504.

When a channel number is assigned to a high-level service channel according to a user input, the electronic apparatus 100, based on the channel number assigned to the high-level service channel, may automatically assign channel numbers of a plurality of low-level service channels included in the high-level service channel to be adjacent to the channel number assigned to the high-level service channel. The low-level service channels may be assigned to sub-channel numbers (for example X-1, X-2, . . . X-n) of a channel number assigned to the high-level service channel, or consecutive channel numbers succeeding the channel number assigned to the high-level service channel. However, this is only an embodiment, and each of the high-level service channel and the low-level service channel may be assigned according to user input, respectively.

When a user command to display an electronic program guide (EPG) is received, the electronic apparatus 100 may provide the EPG including a plurality of broadcast channels 10 and a plurality of service channels 20 mapped to a plurality of services, as illustrated in FIG. 1.

As illustrated in FIG. 1, the EPG may include information 30 on a channel number and information 40 on a channel name for the broadcast channel and the service channel. The EPG may also include information on timings of broadcast programs for each of a plurality of broadcast channels and each of the plurality of service channels. In particular, the information providing area 50 may provide information on broadcast timings of a broadcast program and service on the same time axis. The information providing area included in the EPG may provide time-specific service execution history information provided in previous timings and service time-specific service reservation information to be provided in the future timings based on a current time 60.

The electronic apparatus 100 may perform various operations according to a user command via input that is received while the EPG is displayed. When an area corresponding to a past timing of the first service channel is selected among the information providing areas 50, the electronic apparatus 100 may display a screen including detailed performance history information of a service corresponding to the first service channel. If an area corresponding to a future timing of the first service channel is selected among the information providing area 50, the electronic apparatus 100 may provide a screen for reserving a service corresponding to the first service channel in the selected timing. When a user input is received for reserving a service corresponding to the first service channel, the electronic apparatus 100 may set a reservation service according to the user input, and in the set timing of the information providing area 50, the electronic apparatus 100 may provide the service reservation information including information on a reservation service.

If the first high-level service channel is selected while the EPG is being displayed (that is, when the channel name or channel number of the first high-level service channel is selected), the electronic apparatus 100 may provide a first UI screen for integrating and providing a plurality of services included in the first category corresponding to the first high-level service channel. Further, if one of the plurality of first low-level service channels is selected (that is, when the channel name or channel number of the first low-level service channel is selected), the electronic apparatus 100 may provide a second UI screen to provide a service corresponding to the selected first low-level service channel of the plurality of services included in the first category.

FIG. 2 is a block diagram illustrating a configuration of the electronic apparatus according to an embodiment. As illustrated in FIG. 2, the electronic apparatus 100 may include a user interface 110, a memory 120, and a processor 130. The configuration of the embodiment is not limited thereto, and some configurations may be added or omitted according to a type of an electronic apparatus.

The user interface 110 is configured to receive a user command to control the electronic apparatus 100. The user interface 110 may be implemented as hardware and software. such as a button, a touch pad, a mouse, a keyboard, or a touch screen capable of performing the above-described display function and an operation input function. The button may be various types of buttons such as a mechanical button, a touch pad, a wheel, and the like formed in an any area of the electronic apparatus such as a front surface portion, a side surface portion, and a back surface portion of the outer area of a main body of the electronic apparatus 100.

The user interface 110 may receive various user inputs, such as a user input for searching a channel, a user input for assigning a channel number to a service channel, a user input for requesting the EPG, a user input for reserving a service, or the like. Based on the user input, the processor 130 controls executions of functions of the electronic apparatus 100 corresponding to the user input.

The memory 120 may store data and applications for providing functionality related to operations of the electronic apparatus 100. The memory 120 may be implemented as a memory embedded with the electronic apparatus 100, or may be implemented as a detachable, removable, or modular memory in the electronic apparatus 100, according to the data usage purpose. For example, data for driving the electronic apparatus 100 may be stored in a memory embedded in the electronic apparatus 100, and data for an expanded function of the electronic apparatus 100 may be stored in the memory detachable from the electronic apparatus 100. A memory embedded in the electronic apparatus 100 may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD). In the configuration of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like.

Figure 4:
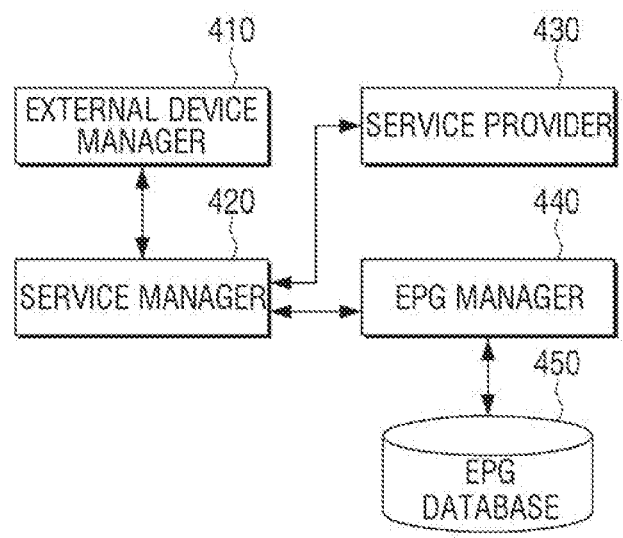
FIG. 4 is a block diagram illustrating a configuration of a memory according to an embodiment.

The memory 120 may map or associate a service channel for a plurality of services and store the map or association therein in any manner, such as a lookup table, database, or other mechanism. The memory 120 may include various configurations as illustrated in FIG. 4 to provide various services based on a plurality of service channels.

The processor 130 may be electrically connected to the user interface 110, the memory 120, and any other component of the electronic apparatus 100, to control the overall operation and functioning of the electronic apparatus 100. In particular, the processor 130 may map each of the plurality of services to a channel number, for example based on a user input that is input through the user interface 110. When a user command for requesting the EPG is input through the user interface 110 and received by the processor 130, the processor 130 may generate an electronic program guide including a plurality of broadcast channels and a plurality of service channels mapped to a plurality of services. In this configuration, the EPG may include information on timings of broadcast programs broadcast in each of the plurality of broadcast channels and service timings for each of the plurality of service channels.

Specifically, when a user command for a channel search (or channel scan) is received through the user interface 110, the processor 130 may provide the search results including information about the plurality of broadcast channels and information about the plurality of services that are returned as results of the search command. When one of the plurality of services presented via the user interface 110 is selected, the processor 130 may control display of a screen for assigning a channel number for a selected service. When a user input is received on the screen for assigning the channel number through the user interface 110, the processor 130 may map the selected service and the assigned channel number, and store the mapped channel number in association with the service in the memory 120.

When a user command for requesting the EPG via the user interface 110 is received, the processor 130 may provide the EPG including a plurality of broadcast channels and a plurality of service channels mapped to a plurality of services. In particular, the EPG may include an information providing area containing information on a broadcast program for each timing and service providing information for each timing based on a same time axis. That is, by providing the information on the broadcast program by timing and the service providing information by timing using the same time axis, the information about the broadcast channel and the service channel may be uniformly provided.

The information providing area may provide time-specific service execution history information provided in a past timing and service time-specific service reservation information to be provided in a future timing based on the current time. In this configuration, when an area corresponding to a past timing of the first service channel is selected from the information providing area through the user interface 110, the processor 130 may provide a screen including detailed performance history information of a service corresponding to the first service channel. In addition, when an area corresponding to a future timing for the first service channel is selected from the information providing area through the user interface, the processor 130 may provide a screen for reserving a service corresponding to the first service channel in the selected timing.

The plurality of service channels according to an embodiment may include a plurality of high-level service channels corresponding to a plurality of categories and a plurality of low-level service channels included in each of the plurality of categories. The first high-level service channel corresponding to the first category and the plurality of first low-level service channel included in the first category may have the adjacent channel numbers.

If the first high-level service channel is selected through the user interface 110 while the EPG is being displayed, the processor 130 may provide a first UI screen for integrating and providing a plurality of services included in the first category. Further, if one of the plurality of first low-level service channels is selected through the user interface 110, the processor 130 may provide a second UI screen to provide a service corresponding to a selected first low-level service channel among the plurality of services included in the first category.

Figure 3:
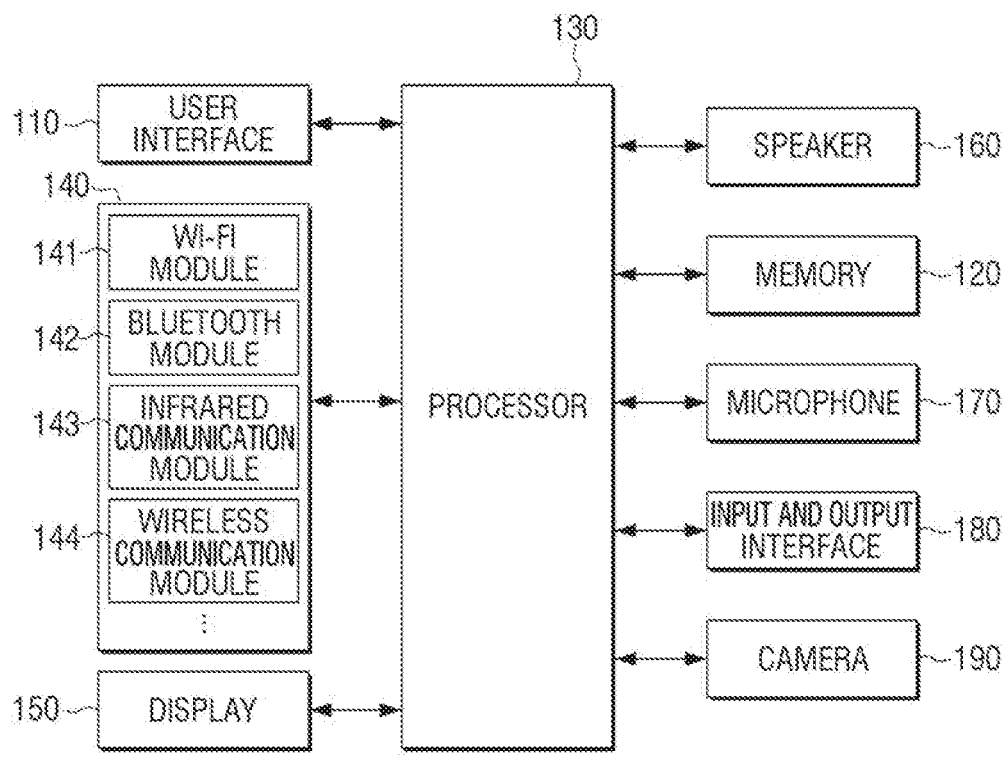

FIG. 3 is a block diagram illustrating a configuration of the electronic apparatus 100 according to an embodiment. As illustrated in FIG. 3, the electronic apparatus 100 may include the user interface 110, the memory 120, the processor 130, a communication interface 140, a display 150, a speaker 160, a microphone 170, an input and output interface 180, and a camera 190. The user interface 110, the memory 120, and the processor 130 have been described in FIG. 2 and redundant descriptions thereof will be omitted.

The communication interface 140 may communicate with other devices of various types. The communication interface 140 includes a Wi-Fi module 141, a Bluetooth module 142, an infrared communication module 143, a wireless communication module 144, and the like. The processor 130 may communicate with various devices using the communication interface 140. Here, the other devices may include a display device such as a TV, an image processing device such as a set-top box, an external server, a control device such as a remote control, an audio output device such as a Bluetooth speaker, a lighting device, a smart cleaner, a home appliance such as a smart refrigerator, a server such as an Internet of Things (IOT) home manager, a light, a blind, an IOT device such as a sensor, or the like.

The Wi-Fi module 141 and the Bluetooth module 142 perform communication using Wi-Fi protocol and Bluetooth protocol, respectively. When using the Wi-Fi module 141 or the Bluetooth module 142, various connection information such as a service set identifier (SSID) and a session key may be transmitted and received, and communication information may be transmitted after the communication connection is established. The infrared ray communication module 143 performs communication according to infrared data association (IrDA) technology that transmits data wireless to local area using infrared rays in wavelengths between visible rays and millimeter waves. The wireless communication module 144 may be a module performing communication according to various communication standards such as Zigbee, 3rd generation (3G), 3rd generation partnership project (3GPP), long term evolution (LTE), LTE advanced (LTE-A), 4th generation (4G), 5th generation (5G), or the like, in addition to the communication methods described above. The communication interface 140 may include at least one of a local area network (LAN) module, Ethernet module, or wired communication module performing communication using a pair cable, a coaxial cable, an optical cable, or the like. According to an embodiment, the communication interface 140 may use the same communication module (for example, Wi-Fi module) to communicate with an external device such as a remote controller and an external server. According to another embodiment, the communication interface 140 may use a different communication module (for example, Wi-Fi module) for communicating with an external device such as a remote controller and an external server. For example, the communication interface 140 may use at least one of an Ethernet module or a Wi-Fi module to communicate with an external server, and may use a Bluetooth (BT) module to communicate with an external device such as a remote controller. However, this is merely exemplary, and the communication interface 140 may use at least one communication module among various communication modules when communicating with a plurality of external devices or an external server.

The display 150 may display an image or video received from a source of image data or video data (for example, set-top box, broadcasting station, or the like) through the input and output interface 180 or the communication interface 140. The image received from the external device may include at least one of a content acquired by an external device from a content provider and a user interface (UI) provided by the external device.

The display 150 may be implemented as any of various types of a display such as a liquid crystal display (LCD), an organic light emitting diode (OLED) display, a plasma display panel (PDP), or the like. The display 150 may include a driving circuit and a backlight unit, which may be implemented in the form of an a-si TFT, a low temperature poly silicon (LTPS) TFT, an organic TFT (OTFT). The display 150 may be implemented as a touch screen coupled with a touch sensor, a flexible display, a third-dimensional display (3D display), or the like.

The display 150 according to an embodiment may include a display panel for outputting an image and a bezel for housing a display panel. In particular, the bezel according to an embodiment may include a touch sensor to sense a user interaction for user input.

The speaker 160 may be an element to audibly output various audio data, various alarm sounds, a voice message, or the like, which are processed by the input and output interface 180. The electronic apparatus 100 may include an audio output device such as the speaker 160 or may include an output device such as an audio output terminal.

The microphone 170 may receive the user voice in an active state of the microphone 170. For example, the microphone 170 may be integrally formed as an integral unit on a high-level side, a front side direction, a side direction, or the like of the electronic apparatus 100. The microphone 170 may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

The input and output interface 180 may input and output at least one of an audio signal and a video signal. The input and output interface 180 and the communication interface 140 may receive an image including at least one of a content and UI from an external device, and output a control command to an external device. The input and output interface 180 may be a high-definition multimedia interface (HDMI), but this is merely exemplary and the input and output interface 180 may be one interface among mobile high-definition link (MHL), universal serial bus (USB), display port (DP), Thunderbolt, video graphics array (VGA) port, RGB port, d-subminiature (D-SUB), digital visual interface (DVI), and the like. According to an embodiment, the input and output interface 180 may include a port for inputting and outputting only an audio signal and a port for inputting and outputting only a video signal, or may be implemented as one port that inputs and outputs both the audio signal and the video signal. Functions of the input and output interface 180 and the communication interface 140 may be provided by either or a combination of the input and output interface 180 and the communication interface 140.

The electronic apparatus 100 may be implemented as a device (for example, set-top box, or the like) omitting the display 150. In this configuration, the electronic apparatus 100 may provide an image or a UI to an external display device through the input and output interface 180, for example via VGA or HDMI, or wired or wirelessly through the communication interface 140.

The camera 190 is an element for capturing images in the surrounding environment of the electronic apparatus 100, and may be provided in one area of the electronic apparatus 100. The camera 190 may be external to the electronic apparatus 100, but this is merely exemplary, and may be electrically connected to the electronic apparatus 100 and in communication with the electronic apparatus via the input and output interface 180 or the communication interface 140.

FIG. 4 is a block diagram illustrating a configuration of a memory according to an embodiment. As illustrated in FIG. 4, the memory 120 of the electronic apparatus 100 may include an external device manager 410, a service manager 420, a service provider 430, an EPG manager 440, which may be software applications executed under control of the processor 130 read from the memory 120, and an EPG database 450.

The external device manager 410 may discover an external device, register the external device, control a registered external device according to a user command, or manage state information of an external device.

The external device manager 410 may search for a new external device according to a discovery method by communication interface protocols (for example, Bluetooth, Bluetooth low energy (BLE), serial, Zigbee, Z-Wave, or the like).

The external device manager 410 may register information on the discovered external device to control the external device or to manage state information thereof. In this configuration, the information on the external device may include an external device name, information on the manufacturer of the external device, information on the communication address of the external device, or the like.

The external device manager 410 may convert a control command transmitted from the service manager 430 based on information on the registered external device, and transmit the converted control command through the communication interface 140 corresponding to the external device. For example, if a control command "Power ON" is obtained from the service manager 420, the external device manager 410 may convert the control command to "Serial 0×16" according to the serial interface, and may transmit the converted control command to the external device via the serial interface.

The external device manager 410 may receive event information from the registered external device and update and manage the latest state information of the registered external device based on the received event information. When the status information request is received from the service manager 430, the external device manager 410 may transmit the status information to the service manager 430 based on the latest status information of the external device.

The external device manager 410 may delete a registered external device from a registered device list according to a user input.

The service manager 420 may manage a service provided by the electronic apparatus 100. To be specific, the service manager 420 may manage a service provided by an application installed in the electronic apparatus 100, an Internet search service, an external device control service, or the like.

The service manager 420 may search for a new service and may map the assigned channel number and the searched new service, for example according to a user input, and store the mapping or association in the memory 420 or the EPG database 450. The service manager 420 may search for at least one service selected by the user from a service list including a plurality of predefined services. Alternatively, the service manager 420 may search for an Internet service based on URL information input by a user. Alternatively, the service manager 420 may search for at least one application installed in a specific directory in the file system. The service manager 420 may search for an application from a predefined application registration table. Alternatively, the service manager 420 may map a channel number to each of a plurality of services through a service channel registration menu based on the found new Internet service, application, external device, or the like as described above.

In one embodiment, the service manager 420 may set the channel names of the plurality of service channels to the channel name set by the user. In another embodiment, the service manager 420 may set channel names of the plurality of service channels based on the predefined mapping table. For example, the service manager 420 may set the channel name based on the type of the external device in the configuration of the external device control service, set the name of the Internet service as the channel name in the configuration of the Internet service, and the application in the configuration of a service related to the application. In another embodiment, the service manager 420 may set a channel name of a service channel by extracting a partial name from a name of an external device or service to be connected. For example, the service manager 420 may set a channel name of a service channel based on a device name of a connected external device, a service name of a service, or a service description.

The service manager 420 may provide a control UI for controlling the services. The service manager 420 may provide a predefined device control UI by types of external devices, and may provide an Internet service webpage or an application execution screen as a control UI.

The service manager 420 may generate a control command based on a user command that is input on the UI for controlling the external device, and transmit the generated control command to the external device manager 410. Alternatively, the service manager 420 may control an Internet service or an application based on a user command input on an Internet service web page or an application execution screen. When a reservation command for controlling the external device is input, the service manager 420 may store the input reservation command in the reservation task database, and transmit the external device control command for each time stored in the reservation task database to the external device manager 410 at the reserved time.

In addition, the service manager 420 may update the external device state information in the EPG according to the state change event of the external device received from the external device manager 410. Alternatively, the service manager 420 may update state information in the EPG according to an event notification API of an Internet service or an application.

The service provider 430 may provide various services. The service provider 430 may provide a service related to an external device through various communication interfaces (for example, ZigBee, Z-Wave, Bluetooth (BT), Bluetooth low energy (BLE), Serial, IP device, etc.). In addition, the service provider 430 may provide an Internet service such as a device control service such as smart things or IFTT, an energy monitoring service, or a weather service. In addition, the service provider 430 may provide a service related to an application installed on various operating systems such as Tizen™, Windows™, Linux™, iOS™, Android™, or the like.

The EPG manager 440 may provide program information and service information for each channel. The EPG manager 440 may provide an EPG based on state information of broadcast programs and services stored in the EPG database 450. In this configuration, the state information of the broadcast program and the service may be provided on the information providing area in the EPG. In addition, the status information of the broadcast program and the service may be provided according to a same time axis, the service status information may provide service history information in the past timing based on the current time, and provide the service reservation information in the future timing.

The EPG manager 440 may display a reservation setting UI for generating a reservation command for controlling an external device at a selected future time in the EPG. In this configuration, when a reservation command is generated through the reservation setting UI, the EPG manager 440 may transmit a reservation time, a type of an external device, and a control command to the service manager 420. The EPG manager 440 may store a reservation time, an external device type, and a control command in the EPG database 450 to display service reservation information in a future timing.

Hereinbelow, with reference to FIGS. 5 to 8, an embodiment of searching for a service channel and allocating a channel number will be described.

First, the electronic apparatus 100 may receive a user command for channel scanning. In this configuration, the user command may be one of a user command by pressing a preset button among the buttons included in the remote controller, a user command input on the UI displayed on the electronic apparatus 100, and a user voice command input through the microphone 170.

Figure 5:
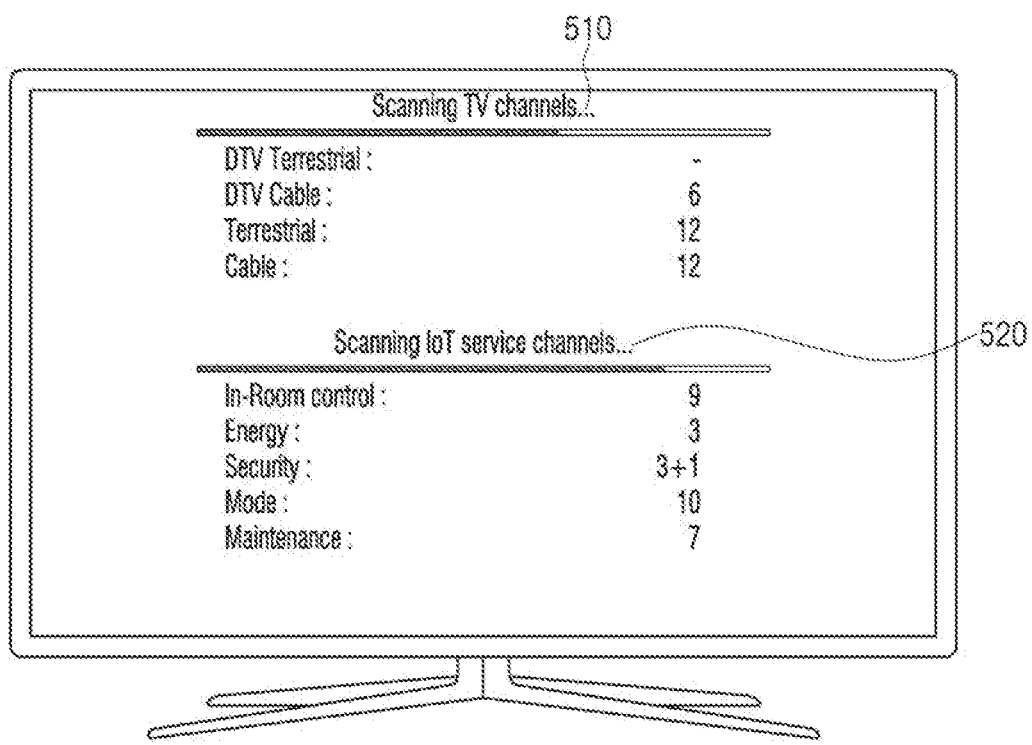

When a user command for channel scanning is input, the electronic apparatus 100 may scan a broadcast channel and a service that can be provided by the electronic apparatus 100. The electronic apparatus 100 may scan a digital television (DTV) terrestrial channel, a DTV cable channel, a terrestrial channel, a cable channel, or the like, and may scan a service for controlling an external device, an Internet service, and a service related to an application. For example, as shown in FIG. 5, the electronic apparatus 100 may provide a UI including a broadcast channel scan result 510 and a service scan result 520. In this configuration, the broadcast channel scan result 510 may provide a scan result for each of a DTV terrestrial channel, a DTV cable channel, a terrestrial channel, and a cable channel, and the service scan result 520 may provide a scan result for a low-level service belonging to the high-level service based on the high-level service corresponding to a predefined category. In this configuration, the high-level service may include in-room control, energy, security, mode, maintenance, etc., but this is only an embodiment and may include various high-level services such as search and weather, for example. The scan result may be updated as the scanned broadcast channel or service is discovered.

If a user command for channel registration of the scanned service is input, the electronic apparatus 100 may display a service list including a plurality of scanned services, as shown in FIG. 6A. In this configuration, as shown in FIG. 6A, only the high-level service may be displayed in the service list. However, this is only an example and a low-level service belonging to the high-level service may be displayed as well.

The service list may include a service name, a service location, and a service channel number, as shown in FIG. 6A. In this configuration, when a service channel number area is selected to assign a channel number to a service, the electronic apparatus 100 may display an indicator (for example, a bar, a highlight, or the like) for allocating a channel number of the service channel. For example, when the channel number area 610 of the energy service is selected to allocate a channel number of the energy service, the electronic apparatus 100 may display an indicator in the channel number area 610 of the energy service. When the number (for example, 6) is input, the electronic apparatus 100 may display the number (for example, 6) input on the channel number area 610 and the channel guide UI 620, as shown in FIG. 6B. The channel guide UI 620 is a UI for guiding a broadcast channel or a service channel starting with 6 and may be a UI provided for setting a channel number by the user so that the channel numbers do not overlap with the existing channel numbers. When the number (for example, 0) is input again, the electronic apparatus 100 may display the number (for example, 60) input on the channel number area 610 and update the channel guide UI

620, as shown in FIG. 6C. In this configuration, if 600 is selected from the channel guide UI 620 or if the user presses a confirmation button after inputting 0 again, the electronic apparatus 100 may assign the channel number of the energy service to 600. In addition, when the service name is changed by selecting the service name area included in the service list, the electronic apparatus 100 may change the channel name of the service.

As the aforementioned method, when the channel number or channel name for another service is set, the electronic apparatus 100 may store the broadcast channel and the service channel in the EPG database 450 as illustrated in FIG. 7. That is, the electronic apparatus 100 may map and store mappings 710, 720 for the channel number, channel name, and service position for each of the broadcast channel and the service channel.

In addition, when the channel number for the high-level service is assigned by the method described above, the electronic apparatus 100 may automatically assign the channel number of the low-level service belonging to the high-level service based on the channel number assigned for the high-level service. That is, the electronic apparatus 100 may assign the channel number of the low-level service so that the channel number of the low-level service belonging to the high-level service is adjacent to the channel number of the high-level service. Of course, the electronic apparatus 100 may automatically associate the channel number for each high-level service and low-level service without user intervention.

For example, if the channel number corresponding to the in-room control service is 500, the electronic apparatus 100, as shown in FIG. 8, may assign the channel number of light #1 service, which is a low-level service belonging to the in-room control service as number 501, assign the channel number of the drapery service channel to 502, and the channel number of the thermostat service channel to 503. As another example, if the channel number corresponding to the energy usage service is 600, the electronic apparatus 100, as shown in FIG. 8, may assign the channel number of the heating/cooling service channel, which is a low-level service belonging to the energy usage service, to 601, and the channel number of the appliances service channel to 602, and the lighting service channel to 603. As still another example, if the channel number corresponding to the security (monitoring) service is 700, the electronic apparatus 100, as illustrated in FIG. 8, may assign the channel number of the front door service channel which is a low-level service belonging to the security (monitoring) service to 701, the channel number of the outdoor service channel to 702, and the channel number of the living room service channel to 703. As a still another example, when the channel number corresponding to the mode service is 800, the electronic apparatus 100 may, as illustrated in FIG. 8, assign the channel number of the good morning service channel which is a low-level service belonging to the mode service to 801, the channel number of the movie service channel to 802, and the channel number of the going out service to 803. As another example, if the channel number corresponding to the maintenance call service is 900, the electronic apparatus 100, as shown in FIG. 8, may assign the channel number of the request service channel, which is a low-level service belonging to the maintenance call service, to 901, the channel number of the status service channel to 902, and the channel number of the history service channel to 903.

As described above, allocating the channel number of the low-level service based on the channel number of the high-level service is merely an embodiment, and the channel number of the low-level service may be set or changed according to a user input.

Figure 10A:
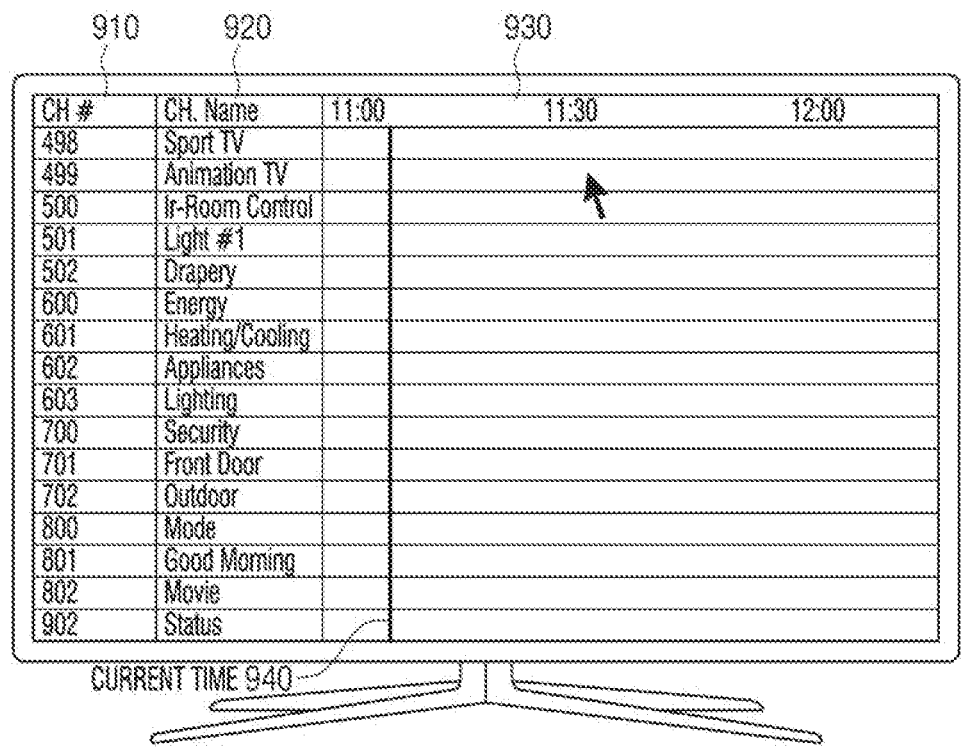

Hereinbelow, with reference to FIGS. 9 to 10A-C, a method of setting service reservation information to EPG will be described.

When a user input for requesting the EPG is received, the electronic apparatus 100 may display the EPG including a broadcast channel and a service channel. For example, the electronic apparatus 100 may provide the EPG as shown in FIG. 9. In this configuration, the EPG may include a channel number area 910, a channel name area 920, and an information providing area 930.

The information providing area 930 may provide information on a broadcast program for each timing and service providing information for each timing according to the same time axis. The information on the broadcast program may include a broadcast program name, a broadcast program, broadcast time, or the like. The service providing information may include time-specific service execution history information provided in the past timing and service time-specific service reservation information to be provided in a future timing based on the time axis 940. The service performance history information may include past usage history of the external device, power usage information of the external device, information on an event detected through the external device, information on a service mode set in the past, and the like. In addition, the service reservation information may include information about a task to be performed by the user through an external device in the future time, information about a service mode reserved by the user, or the like. For example, in the configuration of a service channel corresponding to a service for controlling a light, information on the on/off history of the light may be provided in the past timing, and information on the on/off reservation of the light reserved by the user in the future timing may be provided.

Figure 10B:
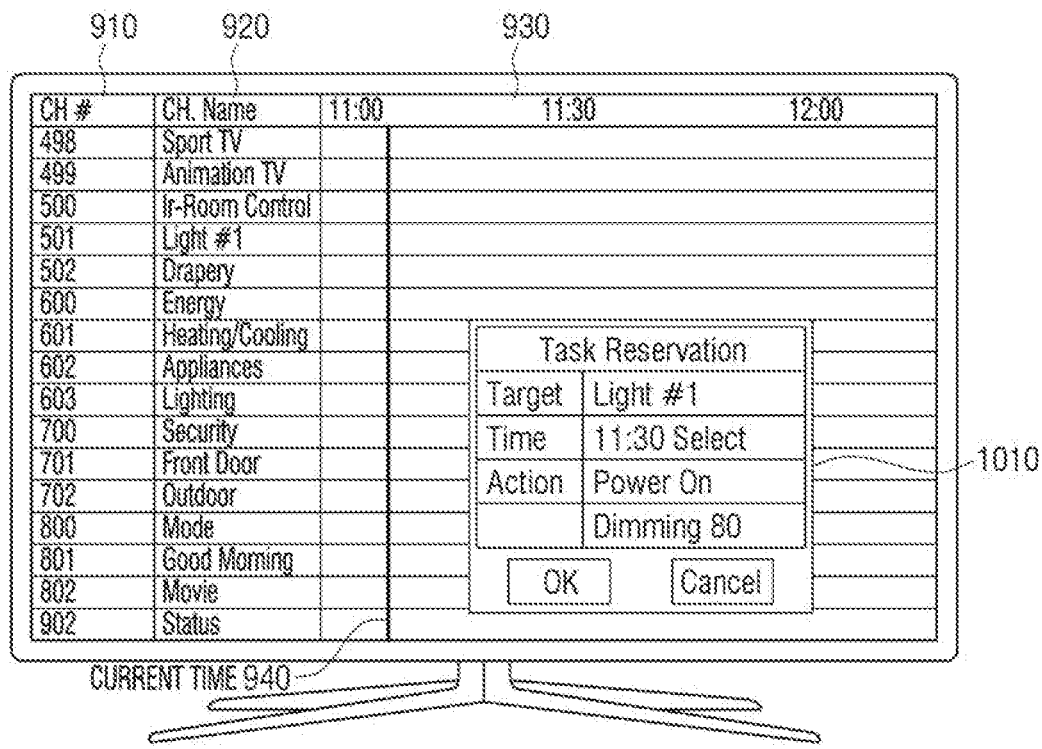

When a user command to select a future timing among the information providing area is received, the electronic apparatus 100 may provide a UI for inputting service reservation information. Specifically, as illustrated in FIG. 10A, when a user command to select the future timing (for example, 11:30) after the current time 940 is detected among the information providing area of the light #1 service channel 501, the electronic apparatus 100, as illustrated in FIG. 10B, may display a UI 1010 for setting the service reservation information of the corresponding service channel. In the UI 1010, an item to set at least one of a target device, a reservation time, and information on a task to be performed by a target device may be included. When the reservation information is set through the UI 1010, the electronic apparatus 100 may display the indicator 1020 guiding the service reservation information on the timing when the service reservation information is set as illustrated in FIG. 10C. When the user command to set the indicator 1020 is input, the electronic apparatus 100 may display a UI illustrated in FIG. 10B, in order to guide the currently-set reservation information to a user. That is, the user may confirm the service reservation information through the indicator 1020 and also modify and delete the service reservation information.

Hereinbelow, various embodiments of a screen provided by the high-level service channel and a screen provided by the low-level service channel will be described with reference to FIGS. 11A to 14B.

Specifically, when the first high-level service channel corresponding to the first category is selected through the user interface 110 while the EPG is displayed, the electronic apparatus 100 may provide a first UI screen to integrate and provide a plurality of services included in the first category. When one of the plurality of first low-level service channels belonging to the first category is selected through the user interface 110 while the EPG is displayed, the electronic apparatus 100 may provide a second UI screen to provide a service corresponding to the selected first low-level service channel among a plurality of services included in the first category.

Figure 11A:
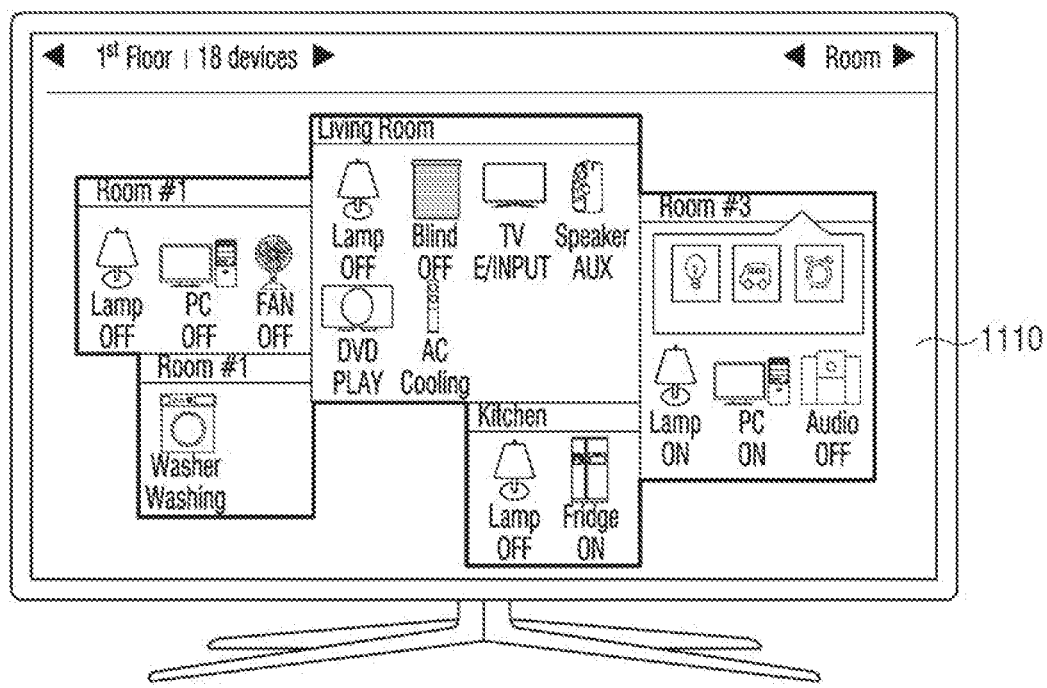
FIGS. 11A-B, 12A-B, 13A-B, and 14A-B are views to describe various embodiments of a screen provided by a high-level service channel and a screen provided by a low-level service channel, according to various embodiments.
Figure 11B:
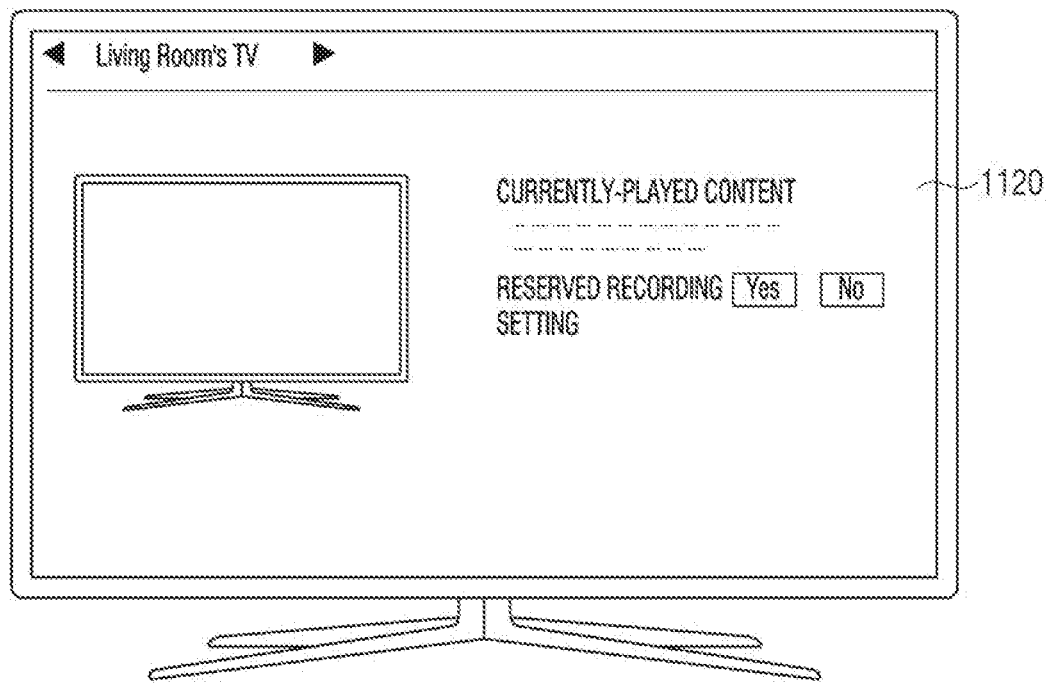

In an embodiment, when the high-level service channel selected by the user is an "in-room control" service channel, the electronic apparatus 100 may provide an integrated UI 1110 for controlling an external device in an integrated manner as illustrated in FIG. 11A. That is, as illustrated in FIG. 11A, the integrated UI 1110 may be provided with a plurality of external devices that can be controlled through the electronic apparatus 100 by locations, and when one of the plurality of external devices is selected, the electronic apparatus 100 may provide a simple control screen for controlling the selected external device. When the low-level service channel selected by the user is a "living room 'TV" service channel, which is a low-level service channel of the "in-room control" service channel, the electronic apparatus 100 may provide a dedicated UI 1120 for controlling a TV located in the living room, as shown in FIG. 11B. That is, as illustrated in FIG. 11B, the dedicated UI 1120 may provide a detailed control screen for controlling the corresponding external device (that is, a TV located in the living room).

Figure 12A:
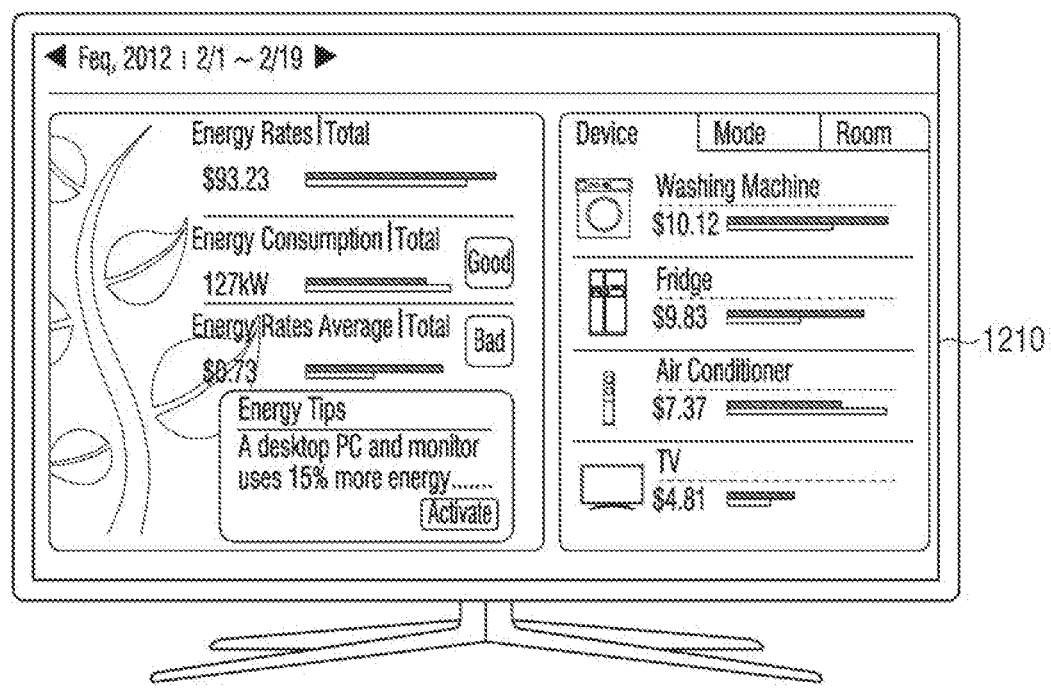
Figure 12B:
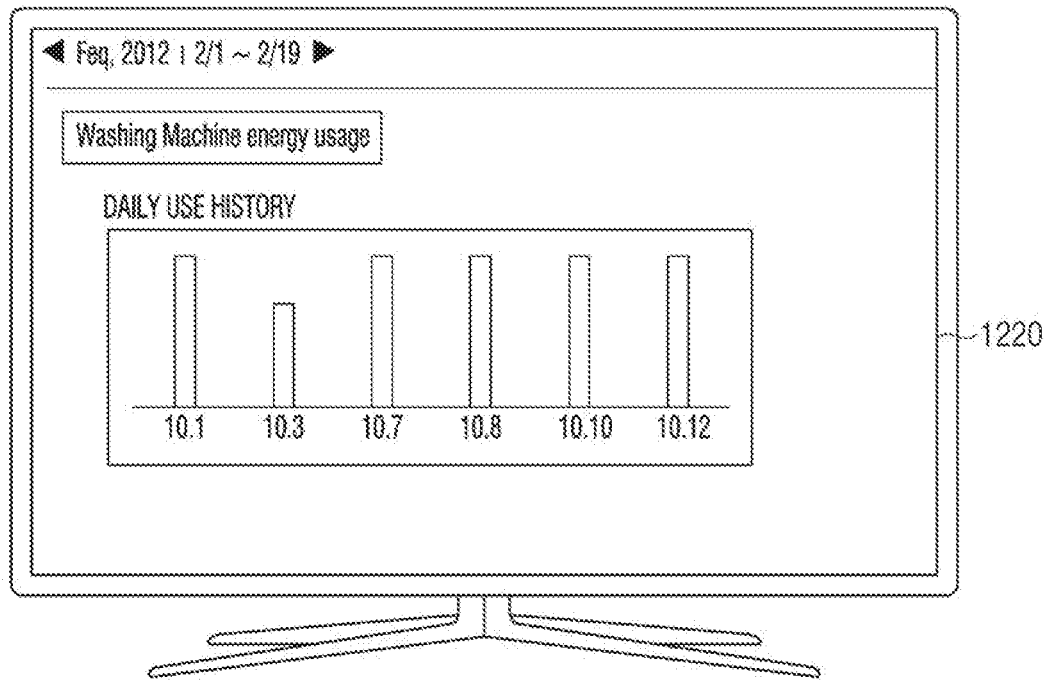

In another embodiment, when the high-level service channel selected by the user is an "energy usage" service channel, the electronic apparatus 100 may provide an integrated UI 1210 for providing power usage of an external device in an integrated manner, as shown in FIG. 12A. That is, as shown in FIG. 12A, the integrated UI 1210 may provide not only information on integrated power usage in the home, but also power usage by devices, power usage by service modes, and power usage by spaces. When the low-level service channel selected by the user is a "washing machine energy usage" service channel, which is a low-level service channel of the "energy usage" service channel, the electronic apparatus 100 may display a dedicated UI 1220 for providing information on power consumption of the washing machine, as shown in FIG. 12B. That is, as illustrated in FIG. 12B, the dedicated UI 1220 may provide power usage by dates of the corresponding external device (that is, a TV located in the living room).

Figure 13A:
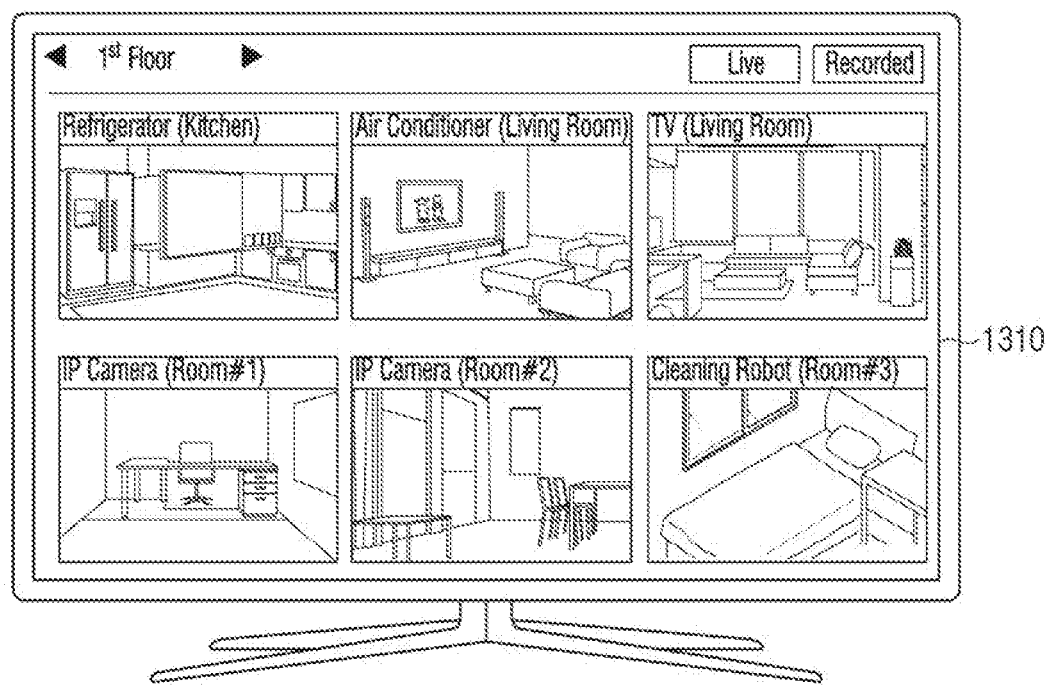
Figure 13B:
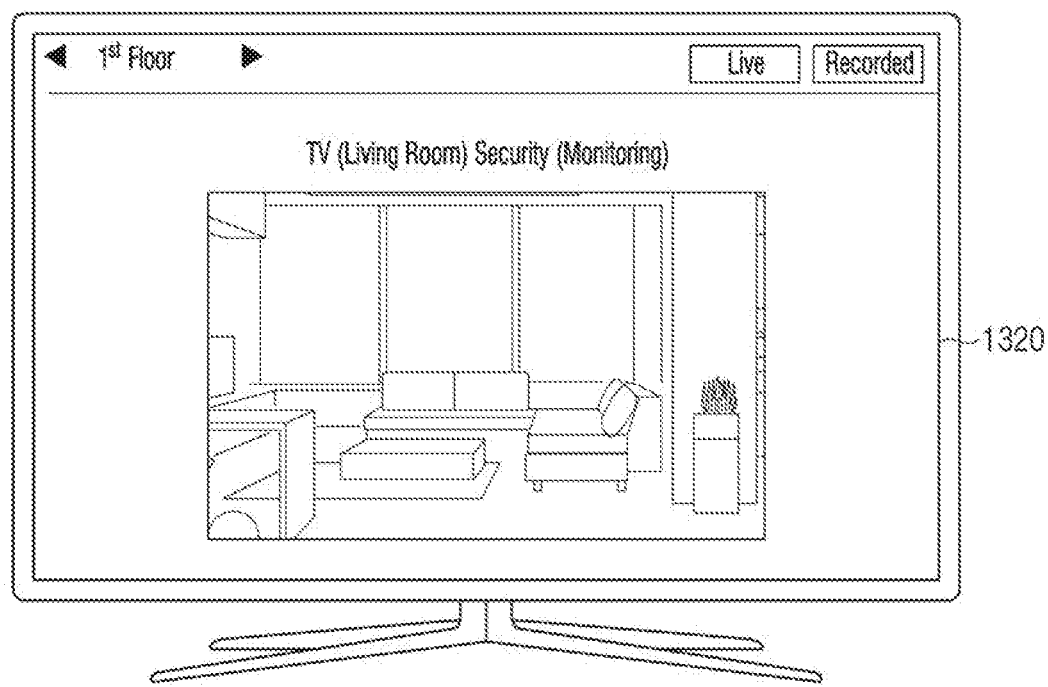

In another embodiment, when the high-level service channel selected by the user is a "security (monitoring)" service channel, the electronic apparatus 100 may provide an integrated UI 1310 for providing a security image captured by a security camera provided in the current home in an integrated manner. That is, as illustrated in FIG. 13A, the integrated UI 1310 may provide a plurality of security images captured by each of the security cameras existing in the home. In this configuration, each of the plurality of security images may be provided at a preset first image quality. When the low-level service channel selected by the user is a "TV (living room) security (monitoring)" service channel, which is a low-level service channel of the "Security (monitoring)" service channel, the electronic apparatus 100 may, as shown in FIG. 13B, provide a dedicated UI 1320 providing a security image captured by the living room TV. That is, as illustrated in FIG. 13B, the dedicated UI 1220 may provide a security image provided by the corresponding external device or the corresponding area at a preset second image quality higher than the preset first image quality.

Figure 14A:
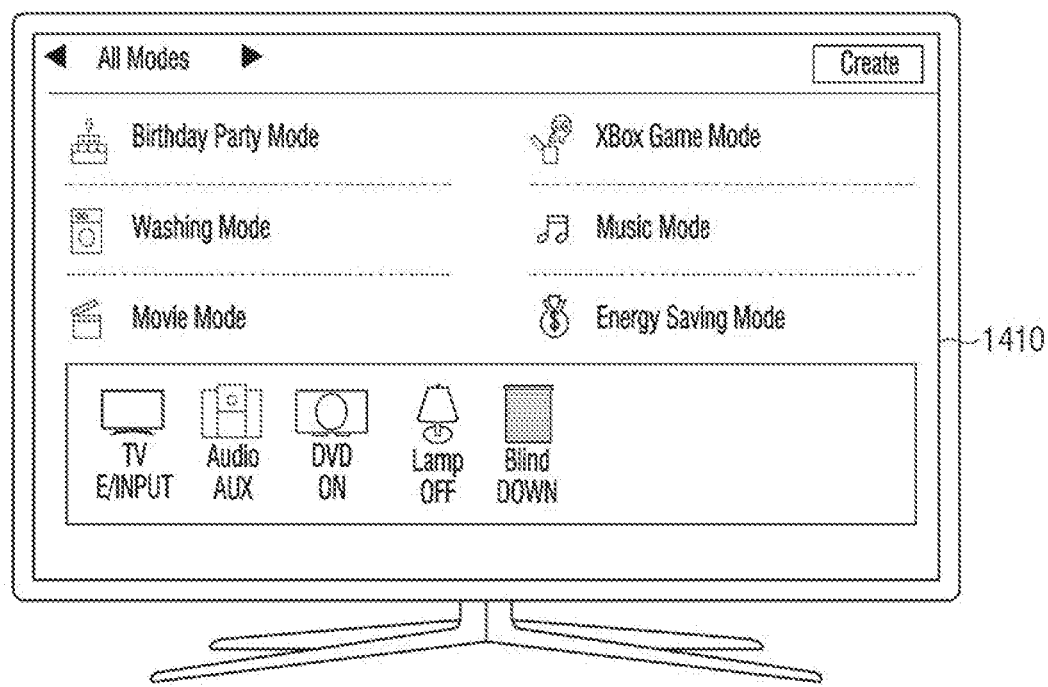
Figure 14B:
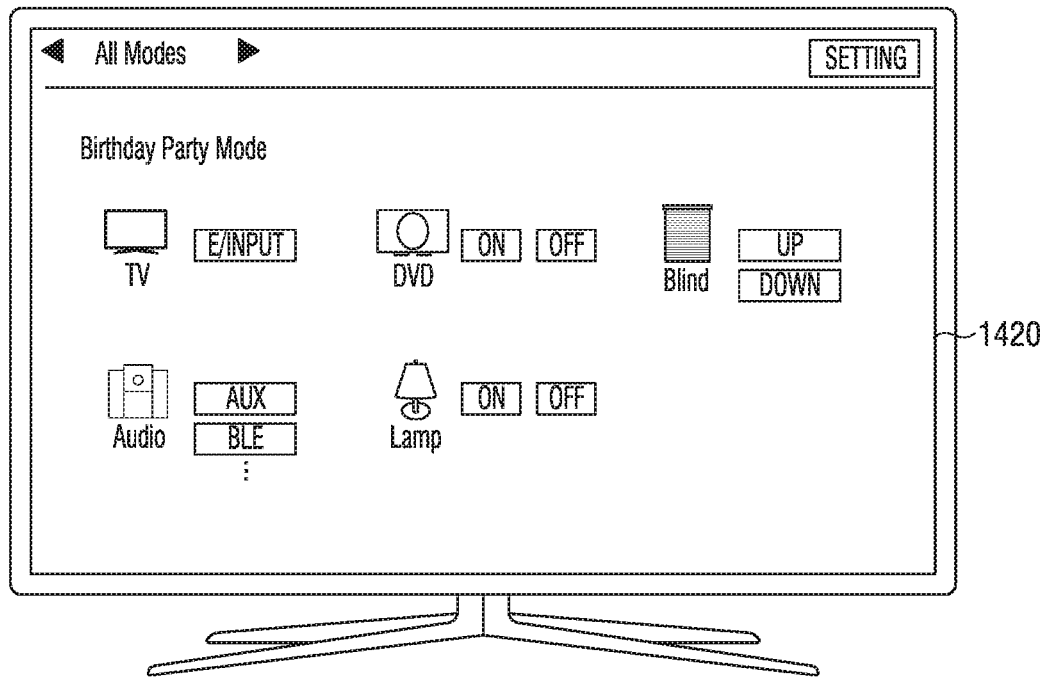

In another embodiment, if the high-level service channel selected by the user is a "mode" service channel, the electronic apparatus 100, as shown in FIG. 14A, may provide an integrated UI 1410 for controlling an external device in a house according to a specific service mode. That is, as shown in FIG. 14A, the integrated UI 1410 may provide the information for the plurality of service modes. If the low-level service channel selected by the user is the "birthday party mode" service channel, which is the low-level service channel of the "mode" service channel, the electronic apparatus 100, as shown in FIG. 14B, may provide a dedicated UI 1420 for providing operational information of an external device within a birthday greeting mode. In this configuration, the dedicated UI 1420 shown in FIG. 14B may generate a control command for individually controlling an external device in the corresponding service mode according to a user input, as well as providing operational information of an external device of the corresponding service mode.

FIG. 15 illustrates a flowchart of a method for controlling an electronic apparatus according to an embodiment.

The electronic apparatus 100 may map each of the plurality of services to channel numbers in operation S1510. As described above, the electronic apparatus 100 may assign the channel numbers for each of a plurality of services by the method of FIGS. 5 to 8, map the assigned channel numbers to the services, and store the same.

The electronic apparatus 100 may identify whether a user input for requesting the EPG is received in operation S1520.

When a user command for requesting the EPG is received in operation S1520-Y, the electronic apparatus 100 may provide the EPG including a plurality of broadcast channels and a plurality of service channels in operation S1530. The EPG may include information about time-specific broadcast programs broadcast on each of the plurality of broadcast channels and service time-specific service provision information provided on each of the plurality of service channels. When a user command for requesting the EPG is not received in operation S1520-N, the method may end.

According to various embodiments as described above, a variety of services in addition to the broadcast service can be performed through one EPG, and the user can obtain a variety of user experiences, and receive not only broadcast services but also various services through one remote controller.

In this disclosure, the term "module" may include a unit implemented with hardware, software, or firmware. The term may be interchangeably used with terms, for example, logic, logic blocks, parts, or circuits. The module may be a part integrally formed or a minimum unit or a part of the part performing one or more functions. For example, according to one embodiment, the module may be implemented in the form of an application-specific integrated circuit (ASIC).

The various embodiments may be implemented with software including one or more instructions stored in the storage medium (machine-readable storage media) readable by a machine (e.g., computer). The device is a device which is operable to call one instruction among instructions stored in the storage medium and execute the instructions, and may include an electronic device (for example, electronic apparatus 100) according to the embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the configuration in which a data is semi-permanently stored in a storage medium from the configuration in which a data is temporarily stored in a storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices. In the configuration of on-line distribution, at least a portion of the computer program product may be stored temporarily or at least temporarily in a storage medium such as a manufacturer's server, a server of an application store, or a memory of a relay server.

Each of the elements (for example, a module or a program) according to various embodiments may be composed of a single entity or a plurality of entities, and some sub-elements of the abovementioned sub-elements may be omitted. The elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order, or other operations may be added.

What is claimed is:

1. An electronic apparatus comprising:
a user interface;
a memory configured to store at least one instruction; and
a processor configured to execute the at least one instruction to:
display at least one service name corresponding to at least one service, provided by the electronic apparatus, that is unassigned to a channel,
obtain a user command for inputting a service channel number to be allocated to a first service name corresponding to a first service, the user command for inputting the service channel number being a numeric input of the service channel number,
based on the user command for inputting the service channel number, display a plurality of service channel numbers including the service channel number,
based on a selection of a first service channel number among the plurality of service channel numbers, store, in the memory, the first service channel number in association with the first service name,
based on a user command for displaying an electronic program guide (EPG), display an EPG comprising at least one broadcast channel and the first service channel number,
based on selection of a future timing of a service channel displayed on the EPG, provide a task reservation screen for setting a reservation that controls operations to be performed by a service corresponding to the selected service channel, among the at least one service, at the future timing, and
based on setting the reservation through the task reservation screen, display an indicator on the selected service channel of the EPG at the future timing,
wherein a plurality of service channels corresponding to the plurality of service channel numbers includes:
a plurality of high-level service channels corresponding to a plurality of service categories, and
a plurality of low-level service channels corresponding to a plurality of services included in the plurality of service categories, and
wherein the processor is further configured to execute the at least one instruction to, based on the first service channel number being allocated to the first service name according to the selection, and a first service channel corresponding to the first service channel number being included in the plurality of high-level service channels, allocate channel numbers adjacent to the first service channel number to names of low-level services included in a service category corresponding to the first service name.

2. The electronic apparatus of claim 1, wherein the EPG further comprises a time axis and an information providing area, the information providing area comprising information of content broadcast on the at least one broadcast channel displayed at timings associated with the content relative to the time axis, and operation information of the first service displayed at timings associated with an operation relative to the time axis, and
wherein the operation information of the first service comprises at least one of past usage history of the electronic apparatus, power usage information of the electronic apparatus, information on an event detected through the electronic apparatus, and information on a service mode set in the past.

3. The electronic apparatus of claim 2, wherein the timings comprise past timings of history information of the content broadcasted on the at least one broadcast channel and operations performed by the at least one service and future timings of the content to be broadcast on the at least one broadcast channel and the operations of the at least one service to be provided.

4. The electronic apparatus of claim 3, wherein the processor is further configured to execute the at least one instruction to:
based on selection of a past timing among the past timings for the operations performed by the at least one service, provide a screen including detailed execution history information of the operations performed by the at least one service at the past timing.

5. The electronic apparatus of claim 1, wherein the processor is further configured to execute the at least one instruction to, based on the first service channel number being allocated to the first service name according to the selection, and the first service channel corresponding to the first service channel number being included in the low-level service channels, allocate, to a category name corresponding to a first service category which includes the first service, a high-level service channel number corresponding to a high-level service channel, and
wherein the high-level service channel number and the first service channel number are consecutive channel numbers of the electronic apparatus.

6. The electronic apparatus of claim 1, wherein the processor is further configured to execute the at least one instruction to:
based on selection of a high-level service channel number corresponding to one of the plurality of high-level service channels, provide a first user interface (UI) screen for integrating and providing a plurality of services included in a corresponding service category, and based on selection of a low-level service channel number corresponding to one of the plurality of low-level service channels, provide a second user interface (UI) screen for providing a corresponding service.

7. The electronic apparatus of claim 1, wherein the at least one service comprises at least one of a search service for Internet search and a control service for controlling an external device in communication with the electronic apparatus.

8. The electronic apparatus of claim 1, wherein the processor is further configured to execute the at least one instruction to, based on receiving a user input to perform a channel search, provide a search result including information on the at least one service and the at least one broadcast channel as a result of the channel search.

9. A method of controlling an electronic apparatus, the method comprising:
  displaying at least one service name corresponding to at least one service, provided by the electronic apparatus, that is unassigned to a channel;
  obtaining a user command for inputting a service channel number to be allocated to a first service name corresponding to a first service, the user command for inputting the service channel number being a numeric input of the service channel number;
  based on the user command for inputting the service channel number, displaying a plurality of service channel numbers including the service channel number;
  based on a selection of a first service channel number among the plurality of service channel numbers, storing the first service channel number in association with the first service name;
  based on a user command for displaying an electronic program guide (EPG), displaying an EPG comprising at least one broadcast channel and the first service channel number;
  based on selection of a future timing of a service channel displayed on the EPG, providing a task reservation screen for setting a reservation that controls operations to be performed by a service corresponding to the selected service channel, among the at least one service, at the future timing; and
  based on setting the reservation through the task reservation screen, displaying an indicator on the selected service channel of the EPG at the future timing,
  wherein a plurality of service channels corresponding to the plurality of service channel numbers includes:
    a plurality of high-level service channels corresponding to a plurality of service categories, and
    a plurality of low-level service channels corresponding to a plurality of services included in the plurality of service categories, and
  wherein the method further comprises, based on the first service channel number being allocated to the first service name according to the selection, and a first service channel corresponding to the first service channel number being included in the plurality of high-level service channels, allocating channel numbers adjacent to the first service channel number to names of low-level services included in a service category corresponding to the first service name.

10. The method of claim 9, wherein the EPG further comprises a time axis and an information providing area, the information providing area comprising information of content broadcast on the at least one broadcast channel displayed at timings associated with the content relative to the time axis, and operation information of the first service displayed at timings associated with an operation relative to the time axis, and
  wherein the operation information of the first service comprises at least one of past usage history of the electronic apparatus, power usage information of the electronic apparatus, information on an event detected through the electronic apparatus, and information on a service mode set in the past.

11. The method of claim 10, wherein the timings comprise past timings of history information of the content broadcasted on the at least one broadcast channel and operations performed by the at least one service and future timings of the content to be broadcast on the at least one broadcast channel and the operations of the at least one service to be provided.

12. The method of claim 11, further comprising:
  based on selection of a past timing among the past timings for the operations performed by the at least one service, providing a screen including detailed execution history information of the operations performed by the at least one service at the past timing.

13. The method of claim 9, further comprising, based on the first service channel number being allocated to the first service name according to the selection, and the first service channel corresponding to the first service channel number being included in the low-level service channels, allocating a high-level service channel number corresponding to a high-level service channel,
  wherein the high-level service channel number and the first service channel number are consecutive channel numbers of the electronic apparatus.

14. The method of claim 9, further comprising:
  based on selection of a high-level service channel number corresponding to one of the plurality of the high-level service channels, providing a first user interface (UI) screen for integrating and providing a plurality of services included in a corresponding service category; and
  based on selection of a low-level service channel number corresponding to one of the plurality of low-level service channels, providing a second user interface (UI) screen for providing a corresponding service.

15. The method of claim 9, wherein the at least one service comprises at least one of a search service for Internet search and a control service for controlling an external device in communication with the electronic apparatus.

16. The method of claim 9, further comprising:
  based on receiving a user input to perform a channel search, providing a search result including information on the at least one service and the at least one broadcast channel as a result of the channel search.

* * * * *